(12) United States Patent
Watanabe et al.

(10) Patent No.: US 11,661,122 B2
(45) Date of Patent: May 30, 2023

(54) AIRFLOW ADJUSTING APPARATUS

(71) Applicant: SUBARU CORPORATION, Tokyo (JP)

(72) Inventors: Naoto Watanabe, Tokyo (JP); Yusaku Dogahira, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 109 days.

(21) Appl. No.: 17/177,281

(22) Filed: Feb. 17, 2021

(65) Prior Publication Data
US 2021/0300485 A1 Sep. 30, 2021

(30) Foreign Application Priority Data

Mar. 27, 2020 (JP) .............................. JP2020-057168

(51) Int. Cl.
 B62D 37/02 (2006.01)
 B62D 35/02 (2006.01)
 H05H 1/24 (2006.01)
 B60R 16/03 (2006.01)
(52) U.S. Cl.
 CPC .............. B62D 37/02 (2013.01); B60R 16/03 (2013.01); B62D 35/02 (2013.01); H05H 1/2406 (2013.01)
(58) Field of Classification Search
 CPC ........ B62D 37/02; B62D 35/02; B60R 16/03; H05H 1/2406
See application file for complete search history.

(56) References Cited

U.S. PATENT DOCUMENTS

| 2005/0161269 | A1* | 7/2005 | Khalighi | B62D 35/005 180/116 |
| 2006/0252361 | A1* | 11/2006 | Henderson | B62D 35/001 454/118 |
| 2010/0072777 | A1* | 3/2010 | Ramsay | B62D 35/00 296/180.1 |
| 2010/0072778 | A1* | 3/2010 | Ramsay | B62D 35/00 296/180.1 |
| 2017/0341521 | A1* | 11/2017 | Kaneko | B60L 3/003 |
| 2021/0101471 | A1* | 4/2021 | Gaither | B60K 17/356 |

FOREIGN PATENT DOCUMENTS

| EP | 1060976 A1 * | 12/2000 | ........... B62D 35/005 |
| JP | 2010-119946 A | 6/2010 | |

* cited by examiner

Primary Examiner — Lori L Lyjak
(74) Attorney, Agent, or Firm — Troutman Pepper Hamilton Sanders LLP

(57) ABSTRACT

An airflow adjusting apparatus includes a downward airflow generator, a rearward airflow generator, and a controller. The downward airflow generator is configured to generate an airflow, and is disposed at a front edge of a movable body to generate the airflow traveling in downward direction. The rearward airflow generator is configured to generate an airflow, and is disposed at a lower surface of the movable body to generate the airflow traveling in a rearward direction. The controller is configured to perform switching between a lifting-force increase control and a lifting-force suppression control in accordance with a state of the movable body to execute one of the controls. The lifting-force increase control is a control of activating the downward airflow generator and deactivating the rearward airflow generator. The lifting-force suppression control is a control of deactivating the downward airflow generator and activating the rearward airflow generator.

19 Claims, 7 Drawing Sheets

AIRFLOW ADJUSTING APPARATUS

CROSS-REFERENCE TO RELATED APPLICATIONS

The present application claims priority from Japanese Patent Application No. 2020-057168 filed on Mar. 27, 2020, the entire contents of which are hereby incorporated by reference.

BACKGROUND

The technology relates to an airflow adjusting apparatus, for example, an airflow adjusting apparatus provided on a movable body.

When a movable body such as a vehicle (e.g., an automobile) moves, an airflow flowing relative to the movable body is formed around an exterior of the movable body as a result of the movement of the movable body. In a case where the movable body is a vehicle, such an airflow is often referred to as a "traveling wind".

Japanese Unexamined Patent Application Publication No. 2010-119946 discloses a technique of disposing a plasma actuator at a predetermined location on an exterior of a vehicle, and causing the plasma actuator to generate an airflow to adjust an airflow around a vehicle body. The plasma actuator uses plasma discharge to generate the airflow.

SUMMARY

An aspect of the technology provides an airflow adjusting apparatus that includes a downward airflow generator, a rearward airflow generator, and a controller. The downward airflow generator is configured to generate an airflow. The downward airflow generator is disposed at a front edge of a movable body to generate the airflow traveling in downward direction. The rearward airflow generator is configured to generate an airflow. The downward airflow generator is disposed at a lower surface of the movable body to generate the airflow traveling in a rearward direction. The controller is configured to perform switching between a lifting-force increase control and a lifting-force suppression control in accordance with a state of the movable body to execute one of the lifting-force increase control and the lifting-force suppression control. The lifting-force increase control is a control of activating the downward airflow generator and deactivating the rearward airflow generator. The lifting-force suppression control is a control of deactivating the downward airflow generator and activating the rearward airflow generator.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
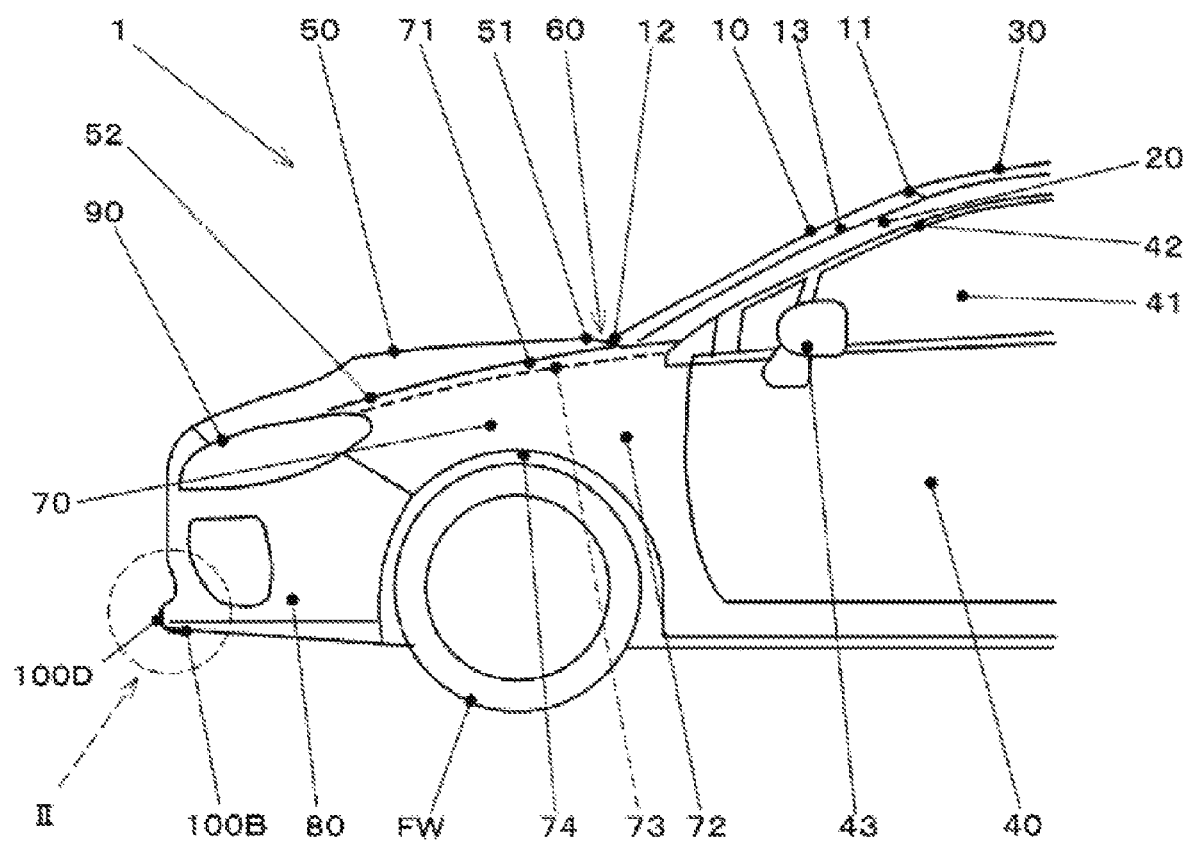
FIG. 1 is a schematic side view of an example of a front part of a vehicle body of a vehicle including an airflow adjusting apparatus according to one example embodiment of the technology.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

In the following, an airflow adjusting apparatus may be provided on a vehicle such as an automobile, which is a non-limiting example of a movable body. Non-limiting examples of the automobile to which the airflow adjusting apparatus is applicable may include a passenger car having a so-called two-box or three-box body shape with an engine room in front of a cabin (i.e., at a front part of the vehicle body).

FIG. 1 is a schematic side view of a front part of a vehicle body of a vehicle including an airflow adjusting apparatus according to a first example embodiment of the technology.

A vehicle 1 may include, for example but not limited to, a windshield 10, a front pillar 20, a roof 30, a front door 40, a hood 50, a cowl 60, a fender 70, a bumper face 80, and a front combination lamp 90.

The windshield 10 may be a window glass provided at a front part of a cabin.

The windshield 10 may have an almost rectangular shape with an upper end 11 and a lower end 12. The windshield 10 may be so tilted rearward that the upper end 11 is on a rear side of the vehicle 1 with respect to the lower end 12.

The lower end 12 may have a curved shape protruding toward a front side of the vehicle 1 in a plan view.

The windshield 10 may have a side end 13 along the front pillar 20.

The windshield 10 may include a laminated glass having a two-dimensional curved surface protruding toward the front side of the vehicle 1 in a horizontal cross-section.

The front pillar 20 may be a vehicle-body structure member which is also called an A-pillar. The front pillar 20 may extend along the side end 13 of the windshield 10.

The front pillar 20 may have a rear edge that is adjacent to a sash provided around a front-door glass 41 at an upper part of the front door 40.

The roof 30 may be a panel-shaped part included as an upper surface of the cabin.

The roof 30 may extend from the upper end 11 of the windshield 10 toward the rear side of the vehicle 1.

The front door 40 may be an opening and closing door provided on a side surface of the front part of the cabin.

The front door 40 may be attached to the vehicle body, for example, the front part of the cabin, with an unillustrated hinge. The hinge may be provided at a front end of the front door 40. The front door 40 may swing around the hinge to open and close.

The front door 40 may include, for example but not limited to, the front door glass 41, a door sash 42, and a door mirror 43.

The front door glass 41 may be provided at an upper part of the front door 40.

The door sash 42 may be a frame holding the front door glass 41. The door sash 42 may be provided along parts including, without limitation, a front edge of the front door glass 41 and an upper edge of the front door glass 41.

The door sash 42 may have a front edge disposed along the front pillar 20, and an upper edge disposed along a roof side frame provided at a side end of the roof 30.

The door mirror 43 may be a rear-view device provided in an upper-front region of a door outer panel included as an outer surface of a body of the front door 40.

The door mirror 43 may be supported by a stay protruding from the door outer panel.

The door mirror 43 may include, for example but not limited to, a mirror body, an angle adjusting mechanism, a tiltable storing mechanism, and any other unit that are contained in a housing.

The hood 50 may be an exterior member covering an upper part of an engine room, and is also called a bonnet. The hood 50 may be a lid-shaped member that is openable and closable.

The hood 50 may substantially have a rectangular shape in a plan view. The hood 50 may be so tilted that a front end of the hood 50 is positioned slightly lower than a rear end of the hood 50. An angle of such tilting may be smaller than a tilting angle of the windshield 10.

The hood 50 may be attached to the vehicle body, for example, a vehicle-body part providing an engine room, with an unillustrated hinge. The hinge may be provided at a rear end of the hood 50. A front end of the hood 50 may swing around the hinge in an upper-lower direction, allowing the hood 50 to open and close.

The hood 50 may have a rear edge 51 that is disposed on the front side of the lower end 12 of the windshield 10 with a spacing between the rear edge 51 and the lower end 12 in a front-rear direction of the vehicle 1.

The rear edge 51 may have a curved shape protruding toward the front of the vehicle 1 in a plan view.

The hood 50 may have a side edge 52 that is disposed adjacent to an edge on an inner side in a vehicle widthwise direction of an upper surface 71 of the fender 70. The side edge 52 of the hood 50 and the edge on the inner side of the upper surface 71 of the fender 70 may have an inevitable gap therebetween.

The cowl 60 may be a depression depressed downward relative to the surface of the hood 50. The cowl 60 may be provided in a region that is on the rear side of the rear edge 51 of the hood 50 and is on the front side of the lower end 12 of the windshield 10.

The cowl 60 may include a member such as a wiper arm that is contained in a cowl top panel. The cowl top panel may include a resin-based material and may have a tray shape having a downward depression.

The cowl 60 may have a side end in the vehicle widthwise direction that is disposed adjacent to a region in the vicinity of the rear end of the upper surface 71 of the fender 70.

The fender 70 may be an exterior member of the vehicle 1 included as a side surface of the engine room or any other surface.

The fender 70 may include the upper surface 71, a side surface 72, and any other surface.

The upper surface 71 may be a region adjacent to the side edge 52 of the hood 50 and a side end of the cowl 60. The upper surface 71 may be provided substantially along a curved surface that is an extension, on an outer side in the vehicle widthwise direction, of a curved surface included as a surface of the hood 50.

The side surface 72 may extend downward from the vicinity of the end, on the outer side in the vehicle widthwise direction, of the upper surface 71.

The side surface 72 may be a slightly-curved surface protruding outward of the vehicle body.

Provided at a border of the upper surface 71 and the side surface 72 in the front-rear direction of the vehicle 1 may be a series of inflection points 73. The inflection points 73 may each be a point at which a curvature of a curved surface increases locally, and may provide a so-called ridge line (or a bent line) of the fender 70.

The side surface 72 may also have an opening 74 of a wheelhouse containing a front wheel FW.

The bumper face 80 may be an exterior member that is provided at a lower part of the front end of the vehicle 1. The bumper face 80 may include a resin material.

The bumper face 80 may be provided on the front side of the opening 74 of the fender 70.

The front combination lamp 90 may be a unit including various lamp devices that are contained in a common housing. Non-limiting examples of the various lamp devices may include a headlamp, a position lamp, and a turn signal lamp.

The front combination lamp 90 may be disposed at the front end of the vehicle 1 at a position that is below the hood 50 and is above the bumper face 80.

The airflow adjusting apparatus according to the first example embodiment may include a plasma actuator 100 described below.

Figure 2:
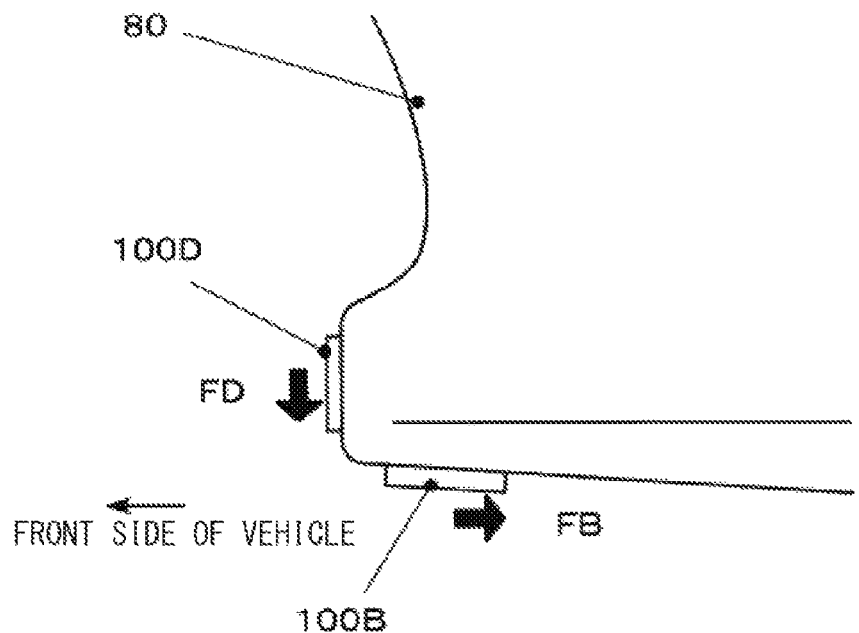
FIG. 2 is an enlarged view of Inset II as illustrated in FIG. 1.

FIG. 2 is an enlarged view of a part II of FIG. 1.

The plasma actuator 100 may be provided on an exterior of the vehicle 1. For example, the plasma actuator 100 may be provided on each of: a front surface that faces toward the front side of the vehicle 1 and is positioned in the vicinity of the lower end of the bumper face 80 included as an exterior of the front part of the vehicle 1; and a lower surface that extends toward the rear side of the vehicle 1 from the lower end of the bumper face 80. In the first example embodiment, a chin spoiler may be provided at the lower end of the bumper face 80, and the plasma actuator 100 may be provided on each of a front surface of the chin spoiler and a lower surface of the chin spoiler.

Hereinafter, the plasma actuator 100 provided on the front surface of the chin spoiler is also referred to as a plasma actuator 100D, and the plasma actuator 100 provided on the lower surface of the chin spoiler is also referred to as a plasma actuator 100B. The plasma actuator 100D and the plasma actuator 100B are each described further in detail below.

The plasma actuator 100D may be a downward airflow generator that generates an airflow FD flowing downward with respect to the vehicle body. According to the first example embodiment, the airflow FD may be generated by the plasma actuator 100D, and may thereafter flow along the front surface of the chin spoiler toward the ground or a road surface on which the vehicle 1 is traveling.

The plasma actuator 100B may be a rearward airflow generator that generates an airflow FB flowing rearward with respect to the vehicle body. According to the first example embodiment, the airflow FB may be generated by the plasma actuator 100B, may thereafter flow along the lower surface of the chin spoiler, and may further flow between the front part of the vehicle body and the ground or the road surface on which the vehicle 1 is traveling, along the lower surface of the front part of the vehicle body.

The plasma actuators 100D and 100B may each have a band shape extending in the vehicle widthwise direction. According to the first example embodiment, the plasma actuators 100D and 100B may each be provided across the bumper face 80 in a widthwise direction of the bumper face 80.

The plasma actuators 100 described above, i.e., the plasma actuators 100D and 100B, may each have a configuration described below.

Figure 3:
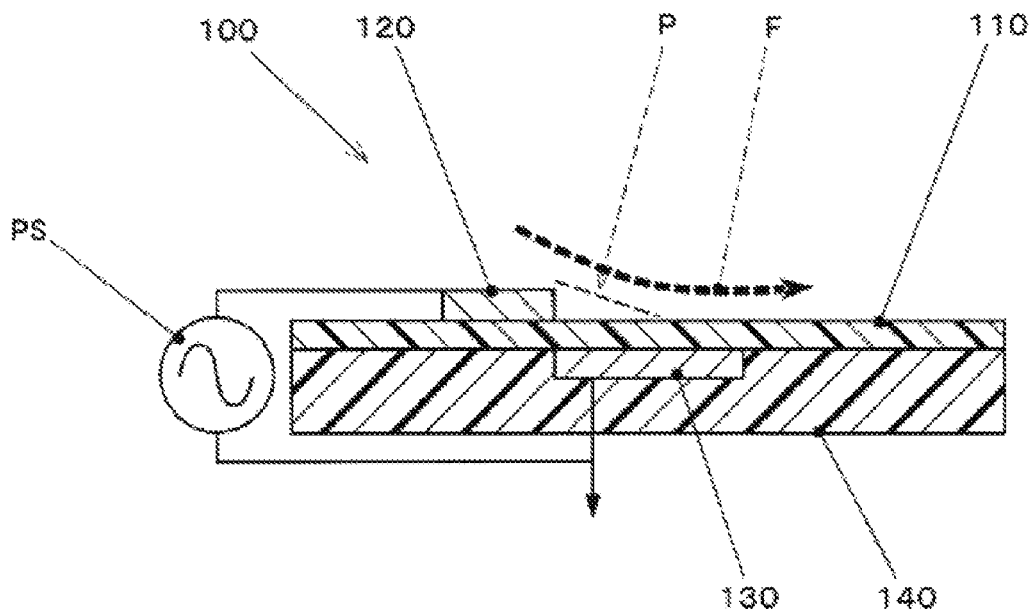
FIG. 3 is a schematic cross-sectional view of an example of a two-electrode plasma actuator provided in the airflow adjusting apparatus according to one example embodiment.

FIG. 3 is a schematic cross-sectional view of a two-electrode plasma actuator to be provided in the airflow adjusting apparatus according to the first example embodiment.

The two-electrode plasma actuator 100 may include, for example but not limited to, a dielectric 110, an upper electrode 120, a lower electrode 130, and an insulator 140.

For example, the dielectric 110 may be a sheet-shaped member including a material such as fluorocarbon resin. Non-limiting examples of the fluorocarbon resin may include polytetrafluoroethylene.

The upper electrode 120 and the lower electrode 130 may each be a tape-shaped electrically-conductive member including, for example, a thin metal film such as a thin copper film.

The upper electrode 120 may be provided on an outer surface side of the dielectric 110. The outer surface side of the dielectric 110 refers to a side that is exposed to the outside when the plasma actuator 100 is attached to a part such as the vehicle body.

The lower electrode 130 may be provided on an inner surface side of the dielectric 110 that is opposite to the outer surface side of the dielectric 110.

The upper electrode 120 and the lower electrode 130 may be so disposed as to be offset with each other in a surface direction of the dielectric 110.

The insulator 140 may be a sheet-shaped member serving as a base of the plasma actuator 100. The insulator 140 may be so disposed on the inner surface side of the dielectric 110 as to cover the lower electrode 130.

When the upper electrode 120 and the lower electrode 130 of the plasma actuator 100 each receive an alternating-current voltage having a predetermined waveform applied by a power supply PS, plasma discharge P may be generated between the upper electrode 120 and the lower electrode 130.

It may be necessary that the applied voltage be high enough to cause electrical breakdown to generate the plasma discharge P. For example, the applied voltage may be within a range from about 1 kV to about 10 kV.

Further, the applied voltage may have a frequency, for example, within a range from about 1 kHz to about 10 kHz.

Upon generation of the plasma discharge P, air on the outer surface side of the plasma actuator 100 may be drawn to the plasma discharge P, generating a wall-jet airflow F flowing in a direction indicated by an arrow in FIG. 3.

The plasma actuator 100 may also be configured to control the waveform of the applied alternating-current voltage to thereby reverse the flowing direction of the airflow F.

The airflow adjusting apparatus according to the first example embodiment may include a control system described below in order to supply driving electric power to the plasma actuators 100D and 100B described above to generate the airflow FD and the airflow FB, thereby performing a control of lifting force which acts on the vehicle body.

Figure 4:
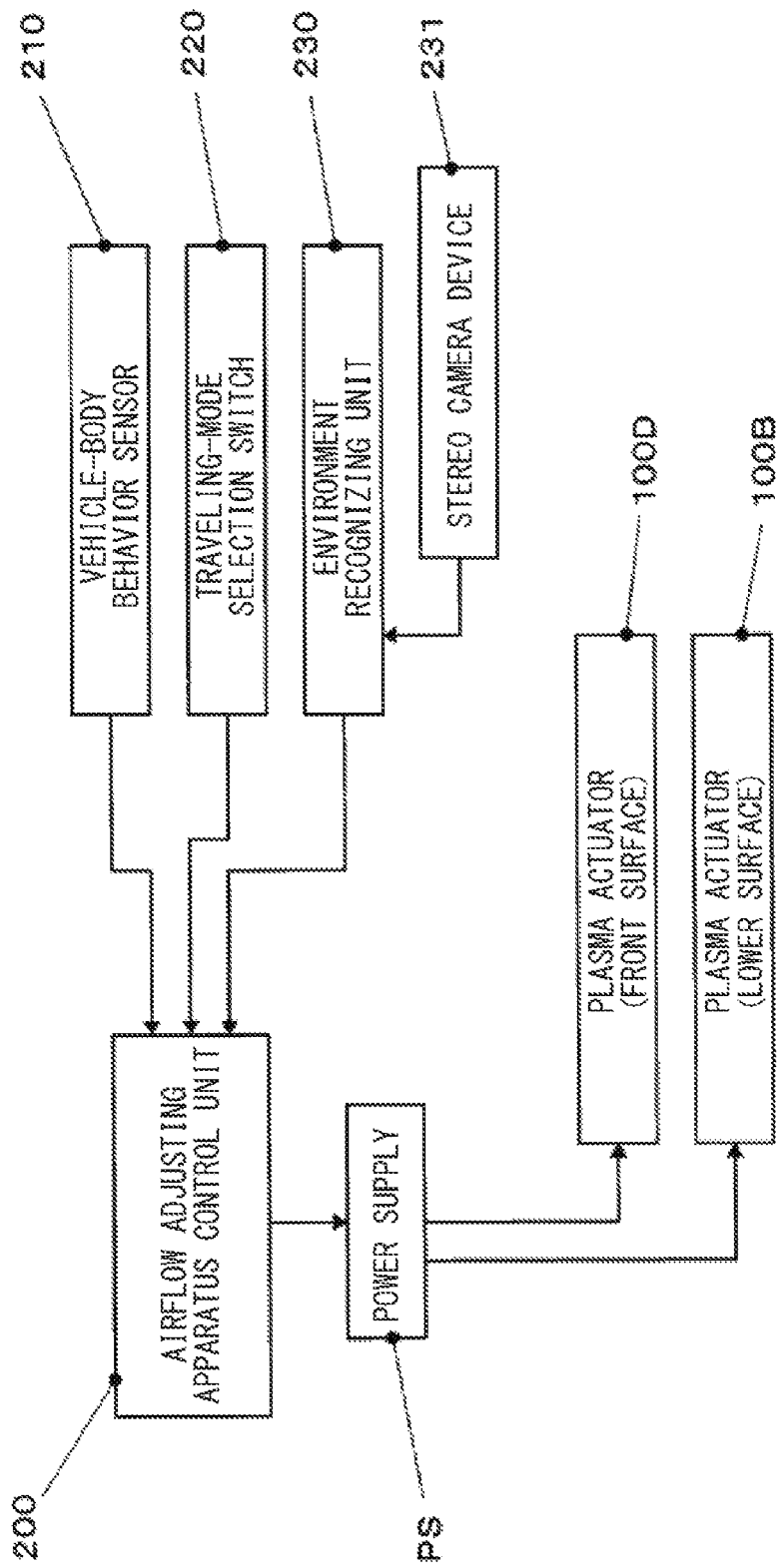
FIG. 4 is a block diagram illustrating an example of a configuration of a control system of a plasm actuator in the airflow adjusting apparatus according to one example embodiment.

FIG. 4 is a block diagram illustrating a configuration of the control system of the plasma actuators 100D and 100B in the airflow adjusting apparatus according to the first example embodiment.

The control system may include, for example but not limited to, an airflow adjusting apparatus control unit 200, a vehicle-body behavior sensor 210, a traveling-mode selection switch 220, and an environment recognizing unit 230.

The airflow adjusting apparatus control unit 200 may control the power supply PS that supplies electric power to the plasma actuators 100D and 100B. The airflow adjusting apparatus control unit 200 may thereby control whether or not to cause each of the plasma actuators 100D and 100B to generate an airflow. In the case of causing any of the plasma actuators 100D and 100B to generate an airflow, the airflow adjusting apparatus control unit 200 may also control intensity of the generated airflow.

The airflow adjusting apparatus control unit 200 may include, for example but not limited to: an information processor such as a central processing unit (CPU); a storage device such as a random-access memory (RAM) or a read-only memory (ROM); an input-output interface; and a bus that couples these units to each other.

The vehicle-body behavior sensor 210 may include a group of sensors that detect various behaviors of the vehicle body.

The vehicle-body behavior sensor 210 may include, for example but not limited to: a yaw rate sensor that detects a yaw rate of the vehicle body; a lateral acceleration sensor that detects an acceleration in a lateral direction of the vehicle body; and a stroke sensor that detects a suspension stroke in the front-rear direction and in a left-right direction.

The traveling-mode selection switch 220 may be a selection operation unit with which a driver selects a setting, such as a setting of a characteristic or a performance, of the vehicle 1 in accordance with a traveling situation as the driver wishes. Herein, the term "driver" refers to an occupant who is related to driving of the vehicle 1.

According to the first example embodiment, the traveling-mode selection switch 220 may allow for selection between a normal mode suitable for normal traveling and a sport traveling mode suitable for sport traveling such as circuit traveling.

In a case where the sport traveling mode is selected, settings different from those in the normal mode may be configured, for example, in terms of: a control of an output of a traveling power source such as an engine; a control of shifting of a transmission; a control of front-rear distribution of driving force in an all-wheel drive (AWD) system; and a characteristic including damping force of a suspension.

In the case where the sport traveling mode is selected, operation of the airflow adjustment apparatus may be also switched from operation in the usual mode.

This is described later in detail.

The environment recognizing unit 230 may recognize an environment surrounding an own vehicle by means of various sensors or any other device. Non-limiting examples of such an environment may include a shape of a lane and presence of various obstacles.

Coupled to the environment recognizing unit 230 may be a stereo camera device 231.

The stereo camera device 231 may include a pair of imaging devices that have an imaging range directed in a frontward direction of the own vehicle and are separated away from each other in the vehicle widthwise direction. The stereo camera device 231 may be configured to use the imaging devices to perform a publicly-known stereo image process to detect a position of an imaging target relative to the own vehicle.

The environment recognizing unit 230 may be configured to recognize the shape of the lane in front of the own vehicle on the basis of an image captured by the stereo camera device 231. The shape of the lane may include, for example, whether the lane includes a curved road and a curvature of the curved road.

A description is given below of a control to be performed in the airflow adjusting apparatus according to the first example embodiment.

Figure 5:
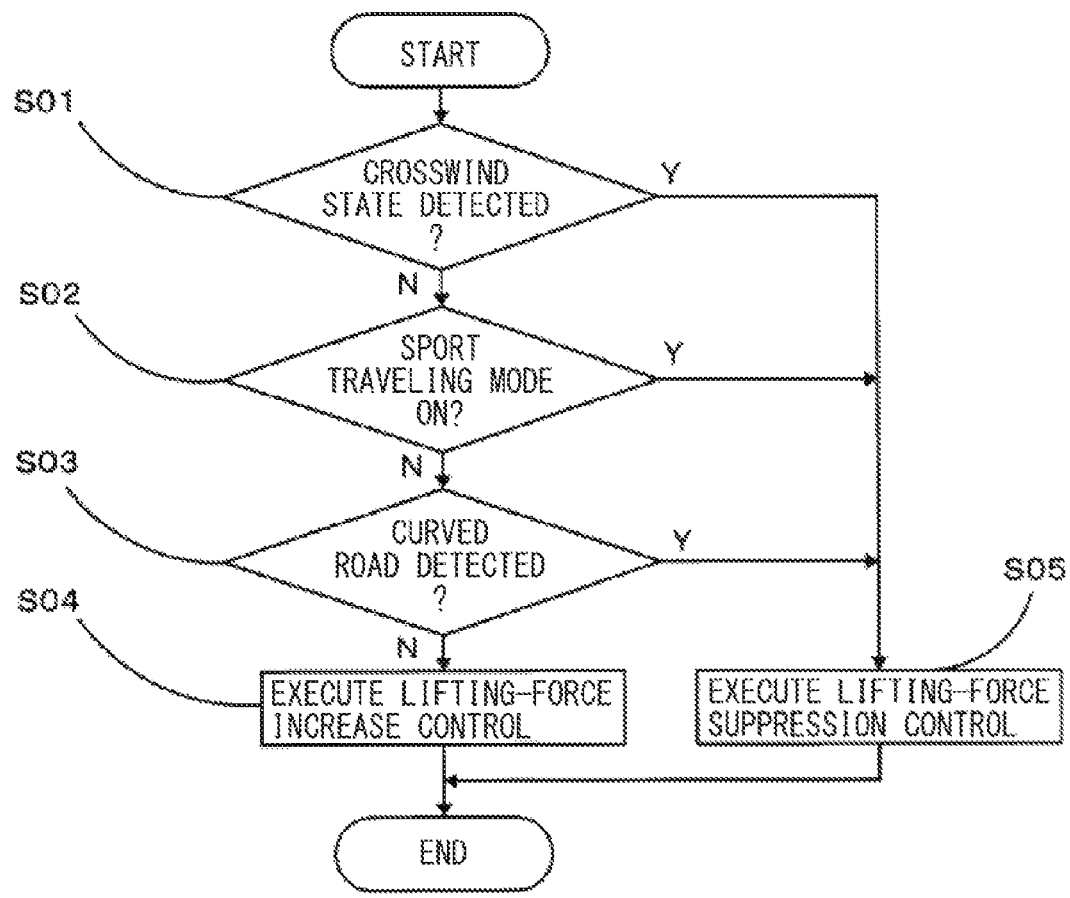
FIG. 5 is a flowchart illustrating an example of a control to be performed in the airflow adjusting apparatus according to one example embodiment.

FIG. 5 is a flowchart illustrating an example of a control to be performed in the airflow adjusting apparatus according to the first example embodiment.

The control of is described below in order of step.

[Step S01: Determination of Crosswind State Detection]

In step S01, the airflow adjusting apparatus control unit 200 may determine, on the basis of information obtained from the vehicle-body behavior sensor 210, whether the vehicle 1 is in a crosswind state, i.e., a state of receiving a crosswind having predetermined intensity or more.

The crosswind state may be detected, for example, on the basis of that the suspension stroke sensor detects a rolling behavior accompanied by a pitching behavior in a nose-up direction and that the yaw rate and a lateral acceleration each have a predetermined value or smaller.

In a case where the crosswind state is detected (Y in step S01), the process may be caused to proceed to step S05. In a case where the crosswind state is not detected (N in step S01), the process may be caused to proceed to step S02.

In one embodiment, the airflow adjusting apparatus control unit 200 performing the process in step S01 may serve as a "behavior detector" of the airflow adjusting apparatus.

[Step S02: Determination of Sport Traveling Mode]

In step S02, the airflow adjusting apparatus control unit 200 may determine whether the sport traveling mode has been selected through the traveling-mode selection switch 220.

In a case where the sport traveling mode has been selected (Y in step S02), the process may be caused to proceed to step S05. In a case where the sport traveling mode has not been selected (N in step S02), the process may be caused to proceed to step S03.

In one embodiment, the airflow adjusting apparatus control unit 200 performing the process in step S02 may serve as an "operation detector" of the airflow adjusting apparatus.

[Step S03: Determination of Curved Road Detection]

In step S03, the airflow adjusting apparatus control unit 200 may determine, on the basis of information obtained by the environment recognizing unit 230, whether the own vehicle is traveling on a curved road having a predetermined curvature or more, or whether the own vehicle is entering such a curved road.

In a case where the own vehicle is traveling on such a curved road or is entering such a curved road (Y in step S03), the process may be caused to proceed to step S05. In a case where the own vehicle is not traveling on such a curved road or is not entering such a curved road (N in step S03), for example, in a case where the own vehicle is traveling on a straight road, the process may be caused to proceed to step S04. The straight road described above may include not only a road that is straight but also a road that is curved but has a curvature less than the predetermined curvature, for example.

In one embodiment, the airflow adjusting apparatus control unit 200 performing the process in step S03 may serve as a "traveling-state detector" of the airflow adjusting apparatus.

[Step S04: Execution of Lifting-force Increase Control]

The airflow adjusting apparatus control unit 200 may execute a lifting-force increase control that causes the plasma actuator 100D to generate the downward airflow FD and deactivates the plasma actuator 100B.

The intensity of the airflow FD may be increased, for example, in accordance with an increase in traveling speed of the vehicle 1, i.e., a vehicle speed.

Thereafter, the airflow adjusting apparatus control unit 200 may end the series of processes or make a return.

[Step S05: Execution of Lifting-force Suppression Control]

The airflow adjusting apparatus control unit 200 may execute a lifting-force suppression control that deactivates the plasma actuator 100D and causes the plasma actuator 100B to generate the rearward airflow FB.

The intensity of the airflow FB may be increased, for example, in accordance with an increase in traveling speed of the vehicle 1, i.e., the vehicle speed.

Thereafter, the airflow adjusting apparatus control unit 200 may end the series of processes or may make a return.

A description is given below of example effects of the airflow adjusting apparatus according to the first example embodiment.

A typical shape of an exterior of a vehicle body of a passenger car involves an airspeed resulting from traveling of the passenger car, and lifting force L is generated when the vehicle body receives a traveling wind W that flows rearward relative to the vehicle body.

One characteristic of the lifting force L is that the lifting force L increases in accordance with an increase in angle of attack. The angle of attack is an angle of a pitching direction of the vehicle body relative to the traveling wind W. For example, in a case where the vehicle receives a crosswind and exhibits, as a result, a rolling behavior accompanied by a pitching behavior in the nose-up direction, the angle of attack increases, and in turn, the lifting force L increases. In this case, the term "angle of attack" is used while the vehicle body is considered as a wing. When the lifting force L increases, a vertical load on tires decreases, which can result in an unstable behavior of the vehicle.

It is, however, desired to secure the vertical load on the tires to stabilize the behavior of the vehicle even in a case where the situation can easily cause an unstable behavior of the vehicle.

Figure 6:
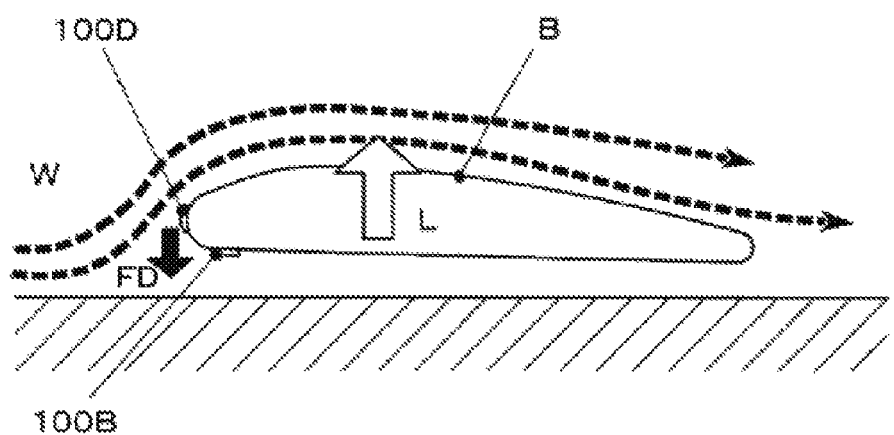
FIG. 6 is a diagram schematically illustrating an example of a state, in a case of performing a lifting-force increase control, of the vehicle including the airflow adjusting apparatus according to one example embodiment.
Figure 7:
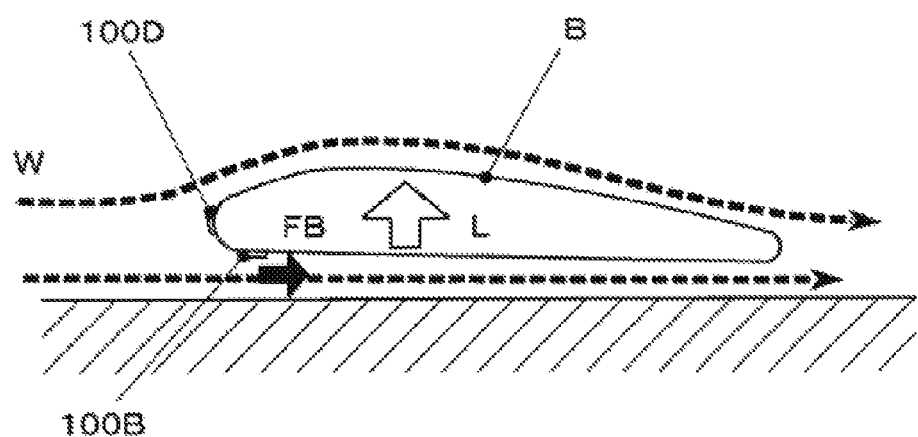
FIG. 7 is a diagram schematically illustrating an example of a state, in a case of performing a lifting-force suppression control, of the vehicle including the airflow adjusting apparatus according to one example embodiment.

Taking into consideration the above, a further description is given below of example effects according to the first example embodiment with reference to FIGS. 6 and 7. FIGS. 6 and 7 each illustrate a vehicle body B as a vehicle body having a shape similar to a Clark Y airfoil, for easier understanding.

FIG. 6 schematically illustrates a state of a vehicle including the airflow adjusting apparatus according to the first example embodiment in a case of performing the lifting-force increase control.

In the lifting-force increase control, the plasma actuator 100D generates the downward airflow FD, thereby providing an air-curtain-like airflow between a front end of the vehicle body B and a road surface.

This suppresses entering of the airflow underfloor of the vehicle body B, thereby increasing lifting force acting on the vehicle body B. This, in turn, reduces a vertical load on the tires and reduces a rolling resistance. Accordingly, it is possible to improve fuel consumption of the vehicle.

An air resistance is also reduced, making it possible to further improve the fuel consumption of the vehicle.

FIG. 7 schematically illustrates a state of the vehicle including the airflow adjusting apparatus according to the first example embodiment in a case of performing the lifting-force suppression control.

In the lifting-force suppression control, the plasma actuator 100B generates the rearward airflow FB, thereby promoting the flowing of the air via the underfloor of the vehicle body. As a result, a flow rate of the airflow increases, and in turn, a flow velocity also increases. This makes it possible to reduce the lifting force L acting on the vehicle body B.

Such an effect of reducing the lifting force L is achievable also in a situation where the vehicle body B exhibits a pitching behavior in the nose-up direction and the angle of attack is increased, for example, in a case where the vehicle receives a crosswind. Accordingly, it is possible to secure the vertical load on the tires also in such a case, thereby preventing an unstable behavior of the vehicle.

As described above, according to the first example embodiment of the technology, example effects described below are achievable.

(1) In the lifting-force increase control, the downward airflow FD generated by the plasma actuator 100D serves as an air curtain that suppresses entering of a traveling wind under the vehicle body B. This increases the lifting force L acting on the vehicle body B, suppressing the vertical load on the tires, and reducing a rolling resistance. Accordingly, it is possible to improve fuel consumption of the vehicle 1, or/and electricity consumption of the vehicle 1 in a case where the vehicle 1 is an electric vehicle.

In the lifting-force suppression control, the entering of the traveling wind between the lower surface of the vehicle body B and the road surface is promoted and a flow velocity of such a traveling wind is increased. This reduces the lifting force L acting on the vehicle body B and increases the vertical load on the tires. Such improvement in grounding property makes it possible to improve stability of the vehicle 1.

(2) In a case where a crosswind acts on the vehicle body B, the lifting-force suppression control may be performed. This prevents an excessive increase in the lifting force L acting on the vehicle body B, in a case where the crosswind received by the vehicle body B causes a rolling behavior accompanied by a pitching behavior in the nose-up direction, thereby shifting the angle of attack with respect to the traveling wind to the positive side. Accordingly, it is possible to secure stability of the vehicle 1.

(3) In a case where the user selects the sport traveling mode, the lifting-force suppression control may be performed. This makes it possible to improve a traveling performance of the vehicle 1 in sport traveling such as circuit traveling.

(4) In a case where the vehicle 1 is traveling on a curved road, the lifting-force suppression control may be performed. This makes it possible to improve stability of the vehicle 1 on the curved road.

(5) In a case where: the vehicle 1 is traveling on a straight road; the crosswind state is not detected; and the sport traveling mode is not selected, the lifting-force increase control may be performed. This increases the lifting force acting on the vehicle body B, suppresses the vertical load on the tires, and reduces the rolling resistance. Accordingly, it is possible to improve the fuel consumption, the electricity consumption, or both of the vehicle 1.

(6) The downward airflow FD and the rearward airflow FD may be generated by means of the plasma actuator 100. This makes it possible to generate the airflows at higher responsiveness with a simple configuration having no movable part, allowing for secured achievement of the example effects described above.

A description is given next of an airflow adjusting apparatus according to a second example embodiment of the technology.

In the following description of each example embodiment, a component common to the example embodiments is denoted with the same reference sign and will not be described further. Described mainly below are points different from the first example embodiment.

According to the second example embodiment, a three-electrode plasma actuator 100A described below may be adopted instead of the two-electrode plasma actuators 100D and 100B included in the airflow adjusting apparatus according to the first example embodiment. According to the second example embodiment, the three-electrode plasma actuator 100A may be disposed in a bent state at a corner of the lower end of the bumper face 80.

Figure 8:
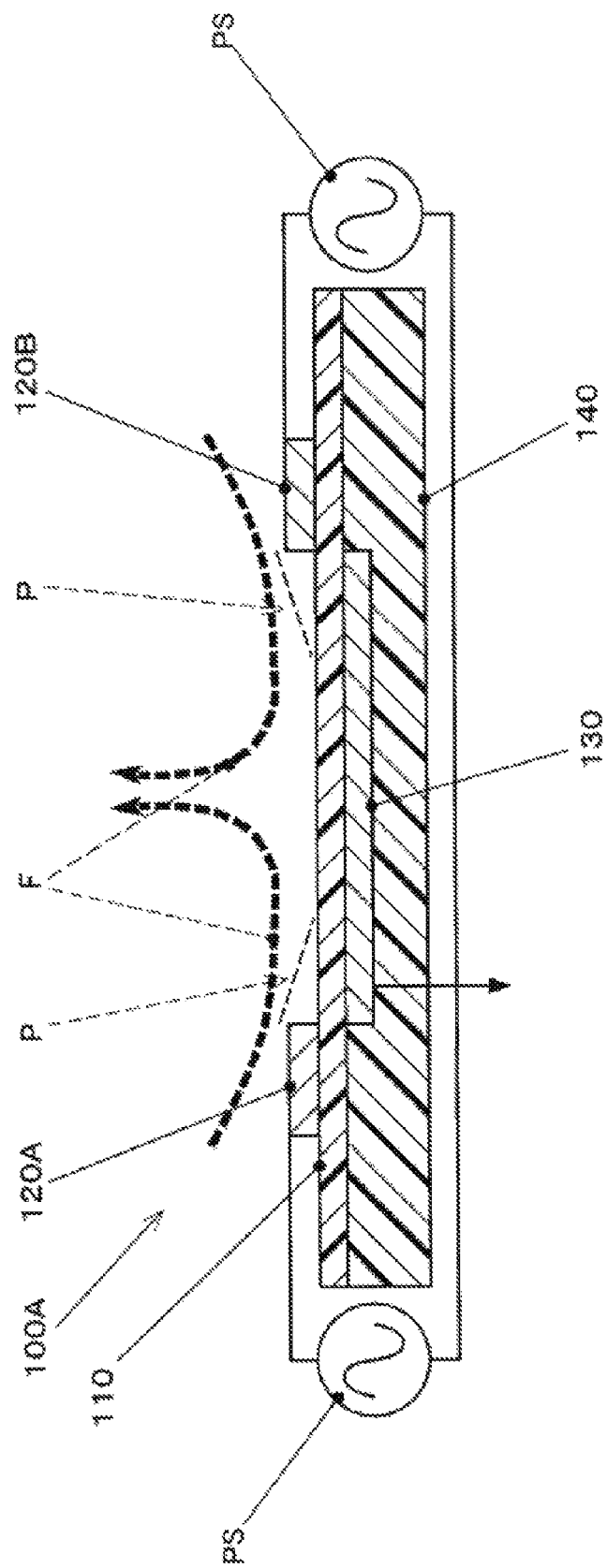
FIG. 8 is a schematic cross-sectional view of an example of a planarly-developed state of a three-electrode plasma actuator to be provided in the airflow adjusting apparatus according to one example embodiment of the technology.

FIG. 8 is a schematic cross-sectional view of the three-electrode plasma actuator 100A to be included in the airflow adjusting apparatus according to the second embodiment of the technology.

The three-electrode plasma actuator 100A illustrated in FIG. 8 may include the dielectric 110 having a flat shape. The dielectric 110 may have planar surfaces, i.e., an outer surface and an inner surface, on respective sides. Disposed on the outer surface may be a pair of upper electrodes 120A and 120B. Disposed on the inner surface may be the lower electrode 130. The upper electrodes 120A and 120B may be disposed symmetrically about the lower electrode 130 in a surface direction of the dielectric 110. The power supplies PS may be coupled to the respective upper electrodes 120A and 120B independently of each other.

The three-electrode plasma actuator 100A having the configuration described above may use the plasma discharge P generated between the upper electrode 120A and the lower electrode 130 and the plasma discharge P generated between the upper electrode 120B and the lower electrode 130 to generate airflows F that are opposed to each other.

In this case, the opposed airflows F may crash to join each other, and the joined airflows F may be deflected. This allows for formation, by synthesis, of an airflow that flows in a direction away from a principal plane of the plasma actuator 100A, typically, in a direction of a normal to the surface of the plasma actuator 100A.

The three-electrode plasma actuator 100A may generate, as with the two-electrode plasma actuator 100 described above, an airflow that flows along the surface of the plasma actuator 100A by applying a voltage to only one of the upper electrodes 120, i.e., the upper electrode 120A or 120B.

In addition, a flowing direction of the joined airflows may be controlled by controlling a factor such as the voltages to be applied to the respective upper electrodes 120A and 120B.

Figure 9:
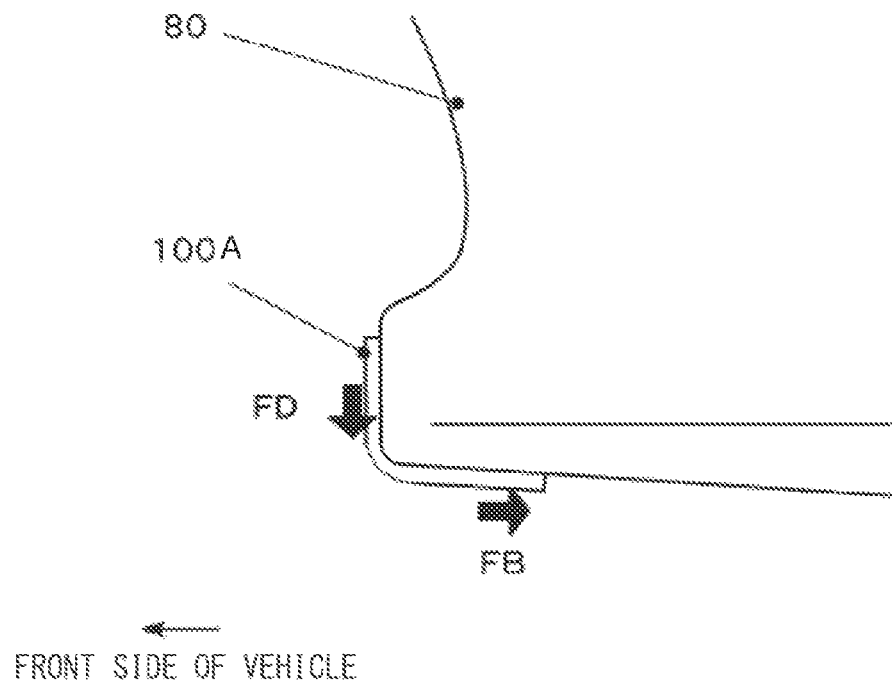
FIG. 9 is an enlarged side view of an example of a lower end of a bumper face of the vehicle including the airflow adjusting apparatus according to one example embodiment.

FIG. 9 is an enlarged side view of the lower end of the bumper face 80 of a vehicle provided with the airflow adjusting apparatus according to the second example embodiment.

According to the second example embodiment, the three-electrode plasma actuator 100A described above may be attached to the corner of the lower end of the front end of the bumper face 80 in a bent state.

That is, the upper electrodes 120A and 120B may be respectively disposed at locations corresponding to the plasma actuators 100D and 100B included in the airflow adjusting apparatus according to the first example embodiment, for example, locations corresponding to the upper electrode 120 of the plasma actuator 100D and the upper electrode 120 of the plasma actuator 100B. The paired upper electrodes 120A and 120B may be coupled to each other by the common dielectric 110, and the lower electrode 130 may be disposed in this coupling region.

According to the second example embodiment of the technology described above, it is possible to achieve effects similar to those of the first embodiment described above. In addition, according to the second example embodiment, it is also possible to achieve an effect of reduction in number of parts and simplification of the configuration of the airflow adjusting apparatus.

A description is given next of an airflow adjusting apparatus according to a third example embodiment of the technology.

Figure 10:
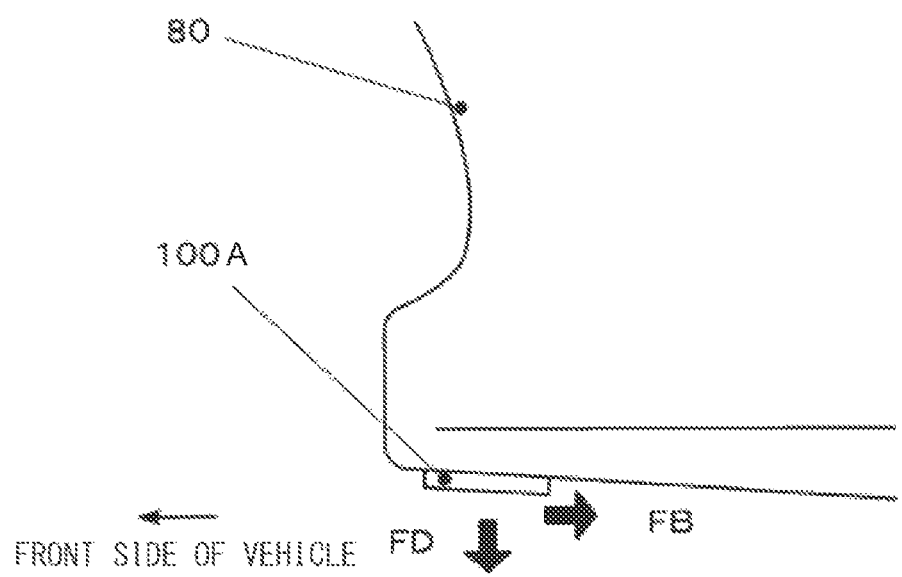
FIG. 10 is an enlarged side view of an example of the lower end of the bumper face of the vehicle including the airflow adjusting apparatus according to one example embodiment of the technology.

FIG. 10 is an enlarged side view of the lower end of the bumper face 80 of a vehicle provided with the airflow adjusting apparatus according to the third example embodiment.

According to the third example embodiment, the single three-electrode plasma actuator 100A may be provided at a location corresponding to the plasma actuator 100B included in the airflow adjusting apparatus according to the first example embodiment. Balance between the voltages applied to the respective upper electrodes 120A and 120B may be controlled, thereby allowing a flowing direction of an airflow to vary or pivot around an axis extending in the vehicle widthwise direction. For example, as described above, both of the paired upper electrodes 120A and 120B may be activated, and opposed airflows are caused to crash and join each other, whereby the airflow FD flowing downward may be generated. For example, a voltage may be applied to one of the upper electrodes 120 (e.g., the upper electrode 120B illustrated in FIG. 8) while stopping application of a voltage to the other of the upper electrodes 120 (e.g., the upper electrode 120A), whereby the airflow FB flowing rearward may be generated.

According to the third example embodiment, the use of such a plasma actuator 100A having a variable wind direction allows for selective generation of the downward airflow FD and the rearward airflow FB from the same plasma actuator 100A. Accordingly, it is possible to achieve both the downward airflow generator and the rearward airflow generator with the common plasma actuator 100A.

According to the third example embodiment of the technology described above, it is also possible to achieve effects similar to those of the first and the second example embodiments described above.

[Modifications]

The technology is not limited to the example embodiments described above, and various modifications and alternations can be made for each of the example embodiments. Such various modifications and alternations also belong to the technical scope of the technology.

(1) The configurations of the airflow adjusting apparatus and the vehicle are not limited to those described above in the example embodiments, and may be modified appropriately.

According to the example embodiments, the movable body may be a vehicle such as an automobile, for example, a passenger car; however, the technology is not limited thereto. One example embodiment of the technology may be applicable to various movable bodies including, for example, an aircraft, various vehicles having a flight function, and a railroad vehicle.

(2) According to the example embodiments, the plasma actuator may serve as the airflow generator; however, this is non-limiting. An airflow may be generated by any method other than using the plasma actuator.

(3) According to the example embodiments, in a case where the airflow adjusting apparatus is applied to a vehicle, the airflow generator may be provided at the lower end of the front end of the bumper face, for example, at an air dam part or at a chin spoiler part; however this is non-limiting. Alternately or additionally, the airflow generator may be provided at a front edge of a wing that serves as an airflow adjusting member that is provided at a location such as a rear part of the vehicle body and has a wing shape, for example.

In this case, it is possible to appropriately control the lifting force generated by the wing.

(4) According to the example embodiments, the traveling on the curved road may be detected on the basis of the result of the recognition of the road shape or the lane shape by a sensor such as the stereo camera device; however, this is non-limiting. Alternately or additionally, the traveling on the curved road may be detected on the basis of information acquired from any other device such as a navigation apparatus including map data and an own vehicle positioning device or communication such as a road-to-vehicle communication or a vehicle-to-vehicle communication. In one example, the traveling on the curved road may be detected on the basis of an increase in steering angle at the time of entering the curved road, generation of a yaw rate, generation of a centripetal acceleration, or any other factor.

(5) According to the example embodiments, in a case where the vehicle receives the crosswind, the unstable behavior may be determined and the lifting-force suppression control may be executed; however, this is non-limiting. The unstable behavior may be determined on the basis of any other state.

For example, the unstable behavior may be determined in a case where a yaw moment generation behavior control is executed when an understeer behavior or an oversteer behavior is detected. The yaw moment generation behavior control may be a control of generating a yaw moment in a behavior-reducing direction by a difference in braking/driving force between left wheels and right wheels.

According to the example embodiments of the technology, it is possible to achieve the following effects.

The downward airflow generator and the rearward airflow generator are provided, and switching between the lifting-force increase control and the lifting-force suppression control is made possible. Accordingly, in the lifting-force increase control, the downward airflow generated by the downward airflow generator suppresses entering of an airflow under the movable body. It is thereby possible to increase lifting force acting on the movable body, for example, on the exterior of the movable body.

In the lifting-force suppression control, the rearward airflow generated by the rearward airflow generator increases the flow velocity of the airflow flowing along the lower surface of the movable body. It is thereby possible to reduce the lifting force acting on the exterior of the movable body.

As a result, it is possible to appropriately control the lifting force acting on the exterior of the movable body by a simple configuration without having a moving surface or without varying the angle of attack of the movable body itself.

In the lifting-force increase control, the airflow generated by the downward airflow generator serves as an air curtain that suppresses entering of a traveling wind under the vehicle body. This increases the lifting force acting on the vehicle body, thereby reducing the vertical load on the tires and reducing the rolling resistance. Accordingly, it is possible to improve fuel consumption, electricity consumption, or both.

In the lifting-force suppression control, entering of a traveling wind between the lower surface of the front part of the vehicle body and the road surface may be promoted. This reduces the lifting force acting on the vehicle body, and thereby increases the vertical load on the tires to improve the grounding property. Accordingly, it is possible to improve stability of the vehicle.

The behavior detector may be configured to detect an unstable behavior of the vehicle. In a case where the vehicle involves the unstable behavior, the lifting-force suppression control may be executed. This decreases the lifting force acting on the vehicle body, and thereby increases the vertical load on the tires. Accordingly, it is possible to stabilize the vehicle.

In a case where the crosswind received by the vehicle body causes a rolling behavior accompanied by a pitching behavior in a nose-up direction, thereby shifting the angle of attack to the positive side with respect to the traveling wind, the lifting-force suppression control may be executed. This prevents lifting force acting on the vehicle body from increasing excessively. Accordingly, it is possible to secure stability of the vehicle.

The operation detector may detect predetermined operation performed by a driver. In a case where it is favorable to execute the lifting-force suppression control on the operation performed by the driver, the operation detector may detect the predetermined operation performed by the driver, and the lifting-force suppression control may be executed on the operation performed by the driver. This makes it possible to improve stability of the vehicle.

For example, in a case where the vehicle performs sport traveling such as circuit traveling or in a case where the vehicle travels on a road with many curved parts such as a mountain road, the lifting-force suppression control may be executed. This makes it possible to improve a traveling performance of the vehicle.

The traveling-state detector may detect the traveling state of the vehicle. In a case where the vehicle is traveling on a curved road, the lifting-force suppression control may be performed. This makes it possible to improve stability of the vehicle on the curved road.

In a case where the vehicle is traveling on a straight road, in which case force generated by the tire is relatively abundant, the lifting-force increase control may be performed. This increases the lifting force acting on the vehicle body, and thereby suppresses the vertical load on the tires and reduces the rolling resistance. Accordingly, it is possible to improve fuel consumption, electricity consumption, or both.

Adopting the plasma actuator makes it possible to generate an airflow at high responsiveness with a simple configuration having no movable part. Accordingly, it is possible to securely achieve the above-described example effects.

The use of the three-electrode plasma actuator in a bent state reduces the number of parts. Accordingly, it is possible to simplify the configuration of the airflow adjusting apparatus.

The use of the three-electrode plasma actuator that allows for switching of the flowing direction of an airflow reduces the number of parts. Accordingly, it is possible to simplify the configuration of the airflow adjusting apparatus.

As described above, according to the example embodiments of the technology, it is possible to provide an airflow adjusting apparatus that is able to appropriately control lifting force acting on an exterior of a movable body.

The airflow adjusting apparatus control unit 200 illustrated in FIG. 4 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the airflow adjusting apparatus control unit 200 illustrated in FIG. 4. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the airflow adjusting apparatus control unit 200 illustrated in FIG. 4.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. An airflow adjusting apparatus comprising:
a downward airflow generator configured to generate an airflow, the downward airflow generator being disposed at a front edge of a movable body to generate the airflow traveling in downward direction;
a rearward airflow generator configured to generate an airflow, the rearward airflow generator being disposed at a lower surface of the movable body to generate the airflow traveling in a rearward direction; and
a controller configured to perform switching between a lifting-force increase control and a lifting-force suppression control in accordance with a state of the movable body to execute one of the lifting-force increase control and the lifting-force suppression control, the lifting-force increase control being a control of activating the downward airflow generator and deactivating the rearward airflow generator, the lifting-force suppression control being a control of deactivating the downward airflow generator and activating the rearward airflow generator.

2. The airflow adjusting apparatus according to claim 1, wherein the movable body comprises a vehicle.

3. The airflow adjusting apparatus according to claim 2, wherein
the downward airflow generator is disposed in vicinity of a lower end of a front end of a vehicle body of the vehicle, and
the rearward airflow generator is disposed adjacent to the lower end on a rear side of the lower end in a lower surface of the vehicle body, the lower surface of the vehicle body extending rearward from the front end of the vehicle body.

4. The airflow adjusting apparatus according to claim 2, further comprising
a behavior detector configured to detect an unstable behavior of the vehicle, wherein
the controller is configured to execute the lifting-force suppression control in a case where the behavior detector detects the unstable behavior of the vehicle.

5. The airflow adjusting apparatus according to claim 3, further comprising
a behavior detector configured to detect an unstable behavior of the vehicle, wherein
the controller is configured to execute the lifting-force suppression control in a case where the behavior detector detects the unstable behavior of the vehicle.

6. The airflow adjusting apparatus according to claim 4, wherein the behavior detector is configured to detect the unstable behavior in a case where the vehicle receives a crosswind having predetermined intensity or more.

7. The airflow adjusting apparatus according to claim 5, wherein the behavior detector is configured to detect the unstable behavior in a case where the vehicle receives a crosswind having predetermined intensity or more.

8. The airflow adjusting apparatus according to claim 2, further comprising
an operation detector configured to detect predetermined operation performed by a driver of the vehicle, wherein
the controller is configured to execute the lifting-force suppression control in a case where the operation detector detects the predetermined operation.

9. The airflow adjusting apparatus according to claim 3, further comprising
an operation detector configured to detect predetermined operation performed by a driver of the vehicle, wherein
the controller is configured to execute the lifting-force suppression control in a case where the operation detector detects the predetermined operation.

10. The airflow adjusting apparatus according to claim 2, further comprising
a traveling-state detector configured to detect a traveling state of the vehicle, wherein
the controller is configured to execute the lifting-force suppression control in a case where the traveling-state detector detects that the vehicle is traveling on a curved road.

11. The airflow adjusting apparatus according to claim 3, further comprising
a traveling-state detector configured to detect a traveling state of the vehicle, wherein
the controller is configured to execute the lifting-force suppression control in a case where the traveling-state detector detects that the vehicle is traveling on a curved road.

12. The airflow adjusting apparatus according to claim 2, further comprising
a traveling-state detector configured to detect a traveling state of the vehicle, wherein
the controller is configured to execute the lifting-force increase control in a case where the traveling-state detector detects that the vehicle is traveling on a straight road.

13. The airflow adjusting apparatus according to claim 3, further comprising
a traveling-state detector configured to detect a traveling state of the vehicle, wherein
the controller is configured to execute the lifting-force increase control in a case where the traveling-state detector detects that the vehicle is traveling on a straight road.

14. The airflow adjusting apparatus according to claim 1, wherein
the downward airflow generator includes a first plasma actuator, the first plasma actuator including a dielectric, at least a pair of electrodes, and a power supply, the pair of electrodes being disposed with the dielectric interposed between the pair of electrodes, the power supply being configured to apply an alternating-current voltage to the electrodes,
the rearward airflow generator includes a second plasma actuator, the second plasma actuator including a dielectric, at least a pair of electrodes, and a power supply, the pair of electrodes being disposed with the dielectric interposed between the pair of electrodes, the power supply being configured to apply an alternating-current voltage to the electrodes independently of the first plasma actuator.

15. The airflow adjusting apparatus according to claim 2, wherein
the downward airflow generator includes a first plasma actuator, the first plasma actuator including a dielectric, at least a pair of electrodes, and a power supply, the pair of electrodes being disposed with the dielectric interposed between the pair of electrodes, the power supply being configured to apply an alternating-current voltage to the electrodes,
the rearward airflow generator includes a second plasma actuator, the second plasma actuator including a dielectric, at least a pair of electrodes, and a power supply, the pair of electrodes being disposed with the dielectric interposed between the pair of electrodes, the power supply being configured to apply an alternating-current voltage to the electrodes independently of the first plasma actuator.

16. The airflow adjusting apparatus according to claim 14, wherein
a common electrode having one polarity is shared between the first plasma actuator and the second plasma actuator as one of the pair of electrodes having the polarity included in the first plasma actuator and one of the pair of electrodes having the polarity included in the second plasma actuator.

17. The airflow adjusting apparatus according to claim 1, wherein the downward airflow generator and the rearward airflow generator both include a common plasma actuator shared between the downward airflow generator and the rearward airflow generator, the common plasma actuator being configured to switch a flowing direction of an airflow generated by the common plasma actuator between the downward direction and the rearward direction.

18. The airflow adjusting apparatus according to claim 2, wherein the downward airflow generator and the rearward airflow generator both include a common plasma actuator shared between the downward airflow generator and the rearward airflow generator, the common plasma actuator being configured to switch a flowing direction of an airflow generated by the common plasma actuator between the downward direction and the rearward direction.

19. The airflow adjusting apparatus according to claim 17, wherein
the common plasma actuator includes:
a dielectric;
a first electrode that is disposed on a first side of the dielectric and has a first polarity;
a pair of second electrodes that are disposed on a second side of the dielectric and are disposed with the first electrode interposed between the second electrodes in a plane direction of the dielectric, the second electrodes each having a second polarity that is different from the first polarity; and
a power supply configured to apply a corresponding voltage to each of the second electrodes.

* * * * *